Patented Jan. 17, 1939

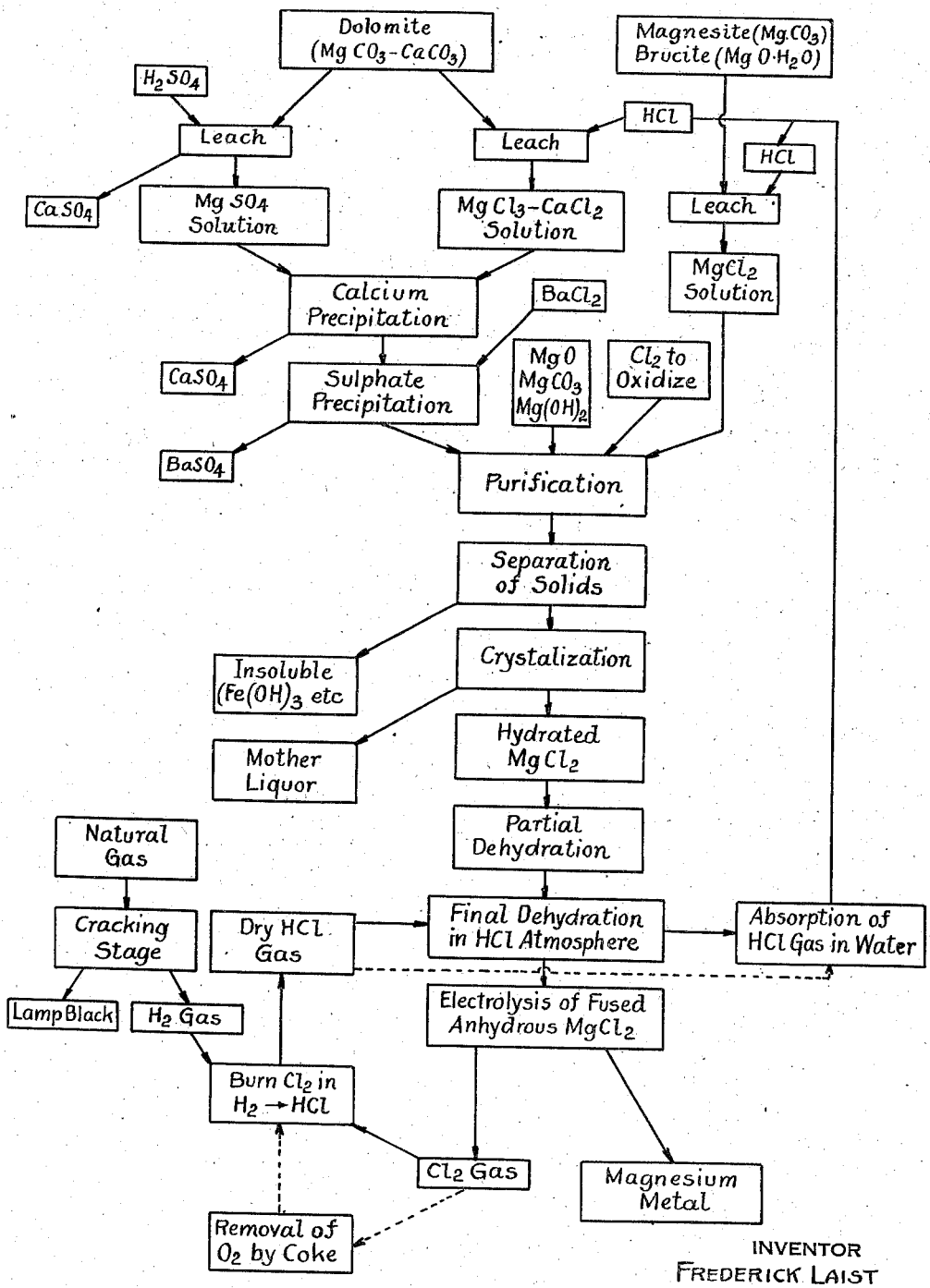

2,144,339

UNITED STATES PATENT OFFICE 2,144,339

RECOVERY OF MAGNESIUM

Frederick Laist, New York, N. Y., assignor to Anaconda Copper Mining Company, New York, N. Y., a corporation of Montana Application June 5, 1936, Serial No. 83,610

7 Claims. (Cl. 204—19)

This invention relates to the recovery of magnesium. More particularly, the invention relates to the recovery of magnesium from naturally occurring magnesium-bearing minerals or ores and has for its principal object the provision of an improved cyclic process for the recovery of magnesium in metallic form from such minerals or ores.

The invention provides a novel process for recovering magnesium and certain improved steps and combinations of steps which are of general application in magnesium recovery processes.

A preferred complete process of the invention involves the treatment of magnesium-bearing ore with hydrochloric acid to produce magnesium chloride. Subsequent steps of the process involve the recovery of metallic magnesium and regeneration of the hydrochloric acid for use in the treatment of additional magnesium-bearing ore.

According to the invention, chlorine produced in the electrolysis of magnesium chloride is reacted with hydrogen to produce hydrogen chloride (hydrochloric acid gas). By employing hydrogen or a gas containing hydrogen and substantially free of oxygen, there is produced a dry or water-free hydrogen chloride-bearing gaseous product which is admirably suited for use in the dehydration of magnesium chloride for treatment by electrolysis. Furthermore, the reaction between hydrogen and chlorine proceeds rapidly to completion. Chlorine produced in electrolytic operations producing magnesium usually is contaminated with air when collected. In order to prevent the production of water when the chlorine is reacted with hydrogen, the chlorine-bearing gaseous product preferably is treated to eliminate oxygen contained therein. The oxygen may be eliminated in any suitable manner, but, preferably, the gaseous product is subjected to the action of carbon at an elevated temperature to produce one or more oxides of carbon.

Natural gas is the preferred source of hydrogen for reaction with the chlorine, as this gas may be cracked easily to provide an oxygen-free gas containing hydrogen in suitable proportion. Furthermore, it is readily available in many localities containing abundant deposits of magnesium-bearing ores.

In the treatment of raw ores for the recovery of magnesium, the question of impurities such as iron must be considered. In accordance with the invention, such impurities are prevented from exercising harmful effects either by controlling the leaching or digesting operation or by providing means for eliminating them from the leaching liquors. For example, the leaching operation may be controlled to maintain an excess of a basic magnesium compound and thus prevent dissolution of impurities such as iron compounds, or the leaching solutions may be suitably treated to effect the precipitation of such impurities.

In the treatment of ores containing both calcium and magnesium, advantage is taken of the different solubilities of calcium and magnesium as chlorides and sulphates.

In accordance with a preferred complete process of the invention, magnesium-bearing ore is leached with aqueous hydrochloric acid to obtain a solution containing magnesium chloride. The resulting solution, preferably after treatment to precipitate impurities therefrom, is suitably concentrated to crystallize the magnesium chloride, which is separated from the mother liquor. The crystalline magnesium chloride thus obtained contains a considerable amount of water of crystallization, generally six molecules, and, accordingly, the next step of the process involves dehydrating the crystalline magnesium chloride. Partial dehydration is carried out in an atmosphere of air, and the partially dehydrated salt is subsequently completely dehydrated in an atmosphere of hydrochloric acid gas (hydrogen chloride). The resulting anhydrous magnesium chloride is fused and, while fused, is subjected to an electrolytic operation to produce magnesium metal and chlorine gas.

The chlorine gas from the electrolytic operation is suitably collected and burned in the presence of hydrogen to obtain substantially dry hydrochloric acid gas. The hydrochloric acid gas thus obtained is advantageously employed in maintaining an appropriate atmosphere over magnesium chloride undergoing dehydration, and thereafter is absorbed in water to obtain aqueous hydrochloric acid which is employed in leaching a further quantity of magnesium-bearing ore.

The invention will be better understood from the following description of preferred complete processes, considered in connection with the accompanying flow sheet.

In treating an ore such as magnesite (magnesium carbonate) or brucite (hydrated magnesium oxide) the ore is leached completely with aqueous hydrochloric acid. The solution thereby obtained, containing as magnesium chloride substantially all of the magnesium originally present in the ore undergoing treatment, is separated from the insoluble residue and is ready for treatment to eliminate impurities and recover magnesium.

In treating an ore such as dolomite (calcium magnesium carbonate), it is advantageous to treat the ore at the outset in such manner that a substantial proportion of the calcium is eliminated. This may be done by dividing a quantity of ore into two approximately equal portions, leaching one portion with hydrochloric acid to obtain a solution containing magnesium chloride and calcium chloride, leaching the other portion with sulphuric acid to obtain a solution containing principally magnesium sulphate, and mixing the two solutions thus obtained to precipitate the calcium from the chloride solution as calcium sulphate and to obtain a final solution containing as magnesium chloride substantially all of the magnesium originally present, with only a small quantity of calcium sulphate still remaining in the solution. The amount of ore leached with hydrochloric acid should be proportioned with respect to the amount of ore leached with sulphuric acid so that the amount of calcium chloride dissolved in the chloride solution is substantially chemically equivalent to the amount of magnesium sulphate dissolved in the sulphate solution. By so proportioning the amounts of ore leached with each acid, the whole of the sulphate solution may be mixed directly with the whole of the chloride solution and a final solution containing as magnesium chloride substantially all of the magnesium originally present in the ore may be obtained. At the same time, the bulk of the calcium originally present in the ore is eliminated as substantially insoluble calcium sulphate.

Calcium sulphate, although substantially insoluble, is not completely so and some will remain dissolved in the magnesium chloride solution. It is therefore advisable to treat the solution after precipitation of the bulk of the calcium with a reagent capable of precipitating such sulphate as remains dissolved in the solution. Barium chloride may be used for this purpose. The barium chloride, dissolved in water, is added to the magnesium chloride solution in an amount substantially chemically equivalent to the amount of calcium sulphate dissolved therein. If an insufficient quantity of barium chloride is added, some sulphate will remain in solution and hamper subsequent extraction of the magnesium. If a substantial excess of barium chloride is added, the barium in solution may cause difficulty in subsequent operations, and in addition, the excess barium chloride added will be lost. The barium sulphate precipitate is separated from the solution and, if desired, may be treated in any conventional manner to regenerate the barium chloride, for example, by reducing the barium sulphate to barium sulphide by means of coke or other suitable reducing agent, dissolving the barium sulphide in water, and treating the solution with hydrochloric acid or with the chloride of a metal whose sulphide is insoluble, such, for example, as zinc chloride, copper chloride, iron chloride, and the like.

The solution containing magnesium chloride, whether obtained from an ore such as magnesite or from an ore such as dolomite, is treated to eliminate impurities which it may contain. The most important impurity is iron, and the purification process herein described is designed primarily to eliminate iron from the solution.

The hydrochloric acid employed to leach the ore is somewhat of a reducing agent, and so the iron may be present in the solution principally as ferrous chloride. Iron in the ferrous form is difficult to precipitate completely, hence the solution is treated with chlorine or with an equivalent reagent capable of oxidizing the iron and other similar impurities in the solution to the form of higher chlorides such, for example, as ferric chloride.

The oxidized solution is treated with a basic magnesium compound to precipitate impurities, such as iron, which have insoluble bases. Magnesium oxide, magnesium carbonate and magnesium hydroxide are suitable basic compounds for this purpose. If the ore contains only a relatively small amount of iron or other similar impurity, the ore itself may in some cases be employed for this purpose. The amount of iron or other impurities in the solution is small, so that only a small quantity of ore need be added in the purifying step. The relatively large amount of basic magnesium compounds in the ore will precipitate insoluble bases from the solution without introducing anything like a corresponding amount of impurities into it.

The precipitate, consisting principally of ferric hydroxide and insoluble bases of other impurities, is separated, by decantation, filtration or other suitable means, from the solution which now contains principally magnesium chloride, together with a small quantity of calcium chloride and an insignificant quantity of other chlorides. The magnesium chloride is recovered from the solution by crystallization. The crystallization may be carried out in any conventional manner after suitably concentrating the solution. No particular difficulty is encountered in effecting crystallization of substantially pure magnesium chloride, because calcium chloride, which constitutes practically the only impurity still in the solution, is extremely soluble and remains in the mother liquor. Other impurities, if present at all, are present in such small quantities that there is little tendency for them to separate with the magnesium chloride during crystallization.

The crystalline magnesium chloride obtained contains six molecules of water of crystallization, and it is necessary to prepare substantially anhydrous magnesium chloride in order to electrolyze the salt in the fused condition. Partial dehydration may be carried out by heating the magnesium chloride crystals in an ordinary atmosphere of air, eliminating water until the dihydrate, that is, magnesium chloride with two molecules of water, is obtained. Final dehydration of the dihydrate is then carried out in an atmosphere of hydrochloric acid gas to obtain anhydrous magnesium chloride. The hydrochloric acid gas prevents decomposition of the hydrous magnesium chloride to magnesium oxide. The hydrochloric acid gas employed to maintain the proper atmosphere over the magnesium chloride undergoing dehydration must not contain a substantial amount of water vapor or it will not be possible to secure adequate dehydration.

The anhydrous magnesium chloride obtained from the dehydration step is fused and is subjected while fused to an electrolytic operation to produce magnesium metal and chlorine gas. The metallic magnesium is removed in the molten state from the cell in which the electrolytic operation is carried out and may, if necessary, be subjected to any conventional treatment to obtain a metallic magnesium product suitable for commercial disposition.

The chlorine evolved in the cell is suitably collected and burned in the presence of hydrogen to form a substantially dry hydrochloric acid gas. Natural gas affords an especially satisfactory source of hydrogen for this purpose. Natural gas, consisting principally of methane, is passed over heated surfaces, for example, over heated checker brick, and is thereby cracked to hydrogen and carbon. The carbon separates out in the form of lampblack which may be suitably collected and disposed of. The gas from the cracking operation consists of almost pure hydrogen and contains substantially no water vapor. It is introduced into a suitable chamber in contact with the chlorine collected from the electrolytic cell substantially in the amount chemically required for the ensuing reaction, during the course of which the hydrogen and the chlorine burn vigorously to produce hydrochloric acid gas. If the chlorine is collected from the electrolytic cell in substantially a pure form the hydrochloric acid gas produced therefrom will contain practically no impurities, and particularly will contain no substantial amount of water vapor.

In view of the high temperature at which the electrolysis of the magnesium chloride is carried out, it is sometimes difficult to avoid diluting the chlorine with air to cool it and thus reduce somewhat its corrosive effect on apparatus with which it comes in contact. If the chlorine is diluted with air, either purposely or accidentally, it is advisable to eliminate the oxygen thereby admixed with the chlorine before treating the chlorine with hydrogen to produce hydrochloric acid gas, for, otherwise, the oxygen will react with the hydrogen to produce water vapor. The oxygen may be eliminated by passing the chlorine in contact with coke or other carbonaceous reducing agents to fix the oxygen as carbon dioxide or as carbon monoxide, preferably as carbon monoxide, for there is less tendency for carbon monoxide to react with hydrogen than is the case with carbon dioxide. The resulting gaseous product, containing chlorine, nitrogen and carbon monoxide (and perhaps some carbon dioxide) is then caused to react with hydrogen to form hydrochloric acid gas. Since no water is present in the reacting gases, and since there is nothing therein to react with hydrogen to form water, the resulting gaseous product containing hydrochloric acid gas contains little or no water vapor.

The hydrochloric acid gas produced as described above is employed to maintain an appropriate atmosphere over magnesium chloride undergoing dehydration. Preferably the dry hydrochloric acid gas is passed slowly through the chamber in which dehydration is being carried out. If desired, substantially the entire quantity of hydrochloric acid gas recovered from the chlorine produced in the electrolysis of the magnesium chloride may be passed through the chamber in which magnesium chloride is being dehydrated. Alternatively a portion of the dry hydrochloric acid gas may be passed through the chamber and the balance by-passed therearound.

The hydrochloric acid gas, after it has been passed through the dehydrating chamber, together with such hydrochloric acid gas as may be by-passed there-around, is dissolved in water to obtain an aqueous hydrochloric acid solution. If, prior to burning the chlorine in the presence of hydrogen, the chlorine has been treated with coke to fix oxygen and a substantial quantity of carbon monoxide has thereby been formed, it is possible that the gaseous product containing hydrochloric acid gas will also contain some carbonyl chloride (although the reaction by which it is formed from carbon monoxide and chlorine does not proceed readily except in the presence of light), but the presence of this compound is not objectionable. It will not adversely affect the production of substantially pure anhydrous magnesium chloride when passed through the chamber in which magnesium chloride is being dehydrated, and, when passed in contact with water to absorb the hydrochloric acid, it will decompose into hydrochloric acid and carbon dioxide. The amount of water admitted to the chamber in which absorption of the hydrochloric acid gas is carried out should be such that the aqueous hydrochloric acid obtained is of suitable concentration for leaching the magnesium-containing ore. The aqueous hydrochloric acid is then conveyed to the stage in which the ore is being leached and is re-employed in preparing magnesium chloride solution from the ore.

The process of the invention as described above affords a relatively simple and economical method of recovering magnesium from magnesium-bearing ores. The only extraneous reagent which need be employed in substantial quantities is hydrochloric acid and since this is regenerated by the use of relatively inexpensive natural gas and is reused in the process, the cost of reagents is limited substantially to the cost of the natural gas plus the cost of replacing unavoidable losses. Other reagents are used in relatively small quantities, and their cost is negligible. By employing substantially dry hydrogen, such as may be obtained by cracking natural gas, in converting chlorine liberated in the electrolytic cell to hydrochloric acid gas, there is obtained a substantially dry product which may be employed directly in maintaining an appropriate atmosphere over magnesium chloride undergoing dehydration, thus eliminating the necessity of drying the gas before it is employed for this purpose.

I claim:

1. In a process for the recovery of metallic magnesium involving dehydration of magnesium chloride in an atmosphere of substantially anhydrous hydrochloric acid gas to obtain anhydrous magnesium chloride and subsequent electrolysis of fused anhydrous magnesium chloride to form metallic magnesium and a gaseous product containing chlorine, the improvement which comprises collecting the gaseous product formed during electrolysis of the magnesium chloride, passing the gaseous product in contact with a carbonaceous agent at an elevated temperature to eliminate free oxygen therefrom, reacting the chlorine contained in the resulting gaseous product with substantially dry hydrogen to produce substantially dry hydrochloric acid gas, and utilizing the resulting hydrochloric acid gas directly in the production of additional anhydrous magnesium chloride for treatment by electrolysis.

2. In the recovery of metallic magnesium from magnesium ore, the improvement which comprises leaching the ore with aqueous hydrochloric acid to produce an aqueous solution containing magnesium chloride, treating the solution thus obtained with chlorine to oxidize chlorides in solution to the form of higher chlorides, and subjecting the thus treated solution to the action of a basic magnesium compound to precipitate impurities from the solution.

3. In the recovery of magnesium from magnesium ore containing one or more metals the sulphates of which are substantially insoluble, the improvement which comprises leaching a quantity of the ore with hydrochloric acid to produce a solution containing magnesium and impurities in the form of chlorides, leaching another quantity of the ore with sulphuric acid to obtain a solution containing magnesium sulphate, and mixing the magnesium sulphate solution with the chloride solution to precipitate impurities in the form of sulphates and produce a solution containing magnesium in the form of magnesium chloride.

4. In the recovery of magnesium from magnesium ore containing relatively large quantities of calcium, the improvement which comprises leaching a quantity of the ore with hydrochloric acid to produce a solution containing magnesium and calcium chlorides, leaching another quantity of the ore with sulphuric acid to produce a solution containing magnesium sulphate, and mixing the magnesium sulphate solution with the magnesium chloride solution to precipitate calcium as calcium sulphate and produce a solution in which substantially all of the magnesium is present as magnesium chloride.

5. In the recovery of magnesium from magnesium ore containing one or more metals the sulphates of which are substantially insoluble, the improvement which comprises treating a quantity of the ore with hydrochloric acid to produce a solution containing magnesium and impurities in the form of chlorides, treating another quantity of the ore with sulphuric acid to produce a solution containing magnesium sulphate, mixing the sulphate solution with the chloride solution to precipitate impurities in the form of sulphates and produce a solution containing magnesium chloride, thereafter adding a soluble compound of a metal having an insoluble sulphate to the solution to insure substantially complete precipitation of sulphates remaining therein, treating the resulting solution with chlorine to insure oxidation of chlorides in solution to the form of higher chlorides, and incorporating a basic magnesium compound in the solution to precipitate impurities having insoluble bases.

6. The method of recovering metallic magnesium from dolomite ore which comprises treating a quantity of the ore with hydrochloric acid to produce a solution containing magnesium and calcium in the form of chlorides, treating another quantity of the ore with sulphuric acid to produce a solution containing magnesium sulphate, mixing the sulphate solution with the chloride solution to precipitate calcium as calcium sulphate and produce a solution containing substantially all of the magnesium as magnesium chloride, treating the magnesium chloride solution with barium chloride to precipitate sulphates remaining in solution as barium sulphate, crystallizing magnesium chloride from the resulting solution, dehydrating the resulting crystalline magnesium chloride to produce anhydrous magnesium chloride, fusing the anhydrous magnesium chloride, subjecting the fused chloride to an electrolytic operation to produce metallic magnesium and chlorine gas, converting the chlorine gas to hydrochloric acid, and utilizing the hydrochloric acid thus produced in leaching a further quantity of magnesium ore.

7. The method of recovering metallic magnesium from ore containing substantial quantities of calcium which comprises treating a portion of the ore with hydrochloric acid to form a solution containing magnesium and calcium in the form of chlorides, treating another portion of the ore with sulphuric acid to form a solution containing magnesium in the form of sulphate, mixing the sulphate solution with the chloride solution to precipitate the bulk of the dissolved calcium as calcium sulphate and to produce a solution containing substantially all of the magnesium as magnesium chloride, treating the magnesium chloride solution with barium chloride to precipitate sulphate remaining in solution as barium sulphate, separating the barium sulphate from the resulting purified magnesium chloride solution, and converting the separated barium sulphate to barium chloride for use in the treatment of a further quantity of sulphate-bearing magnesium chloride solution.

FREDERICK LAIST.